US010353569B2

(12) United States Patent
Lu et al.

(10) Patent No.: US 10,353,569 B2
(45) Date of Patent: Jul. 16, 2019

(54) CROP FRAME ADJUSTING METHOD, IMAGE PROCESSING DEVICE, AND NON-TRANSITORY COMPUTER READABLE STORAGE MEDIUM

(71) Applicant: HTC Corporation, Taoyuan (TW)

(72) Inventors: Cheng-Hsun Lu, Taoyuan (TW); Yi-Ting Hou, Taoyuan (TW); Ke-Neng Wu, Taoyuan (TW); Chieh-Hua Kuo, Taoyuan (TW); Wei-Han Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/132,238

(22) Filed: Apr. 19, 2016

(65) Prior Publication Data

US 2016/0378292 A1 Dec. 29, 2016

Related U.S. Application Data

(60) Provisional application No. 62/183,755, filed on Jun. 24, 2015.

(51) Int. Cl.
| | | |
|---|---|---|
| G06F 3/041 | (2006.01) | |
| G06F 3/0488 | (2013.01) | |
| G06F 3/0484 | (2013.01) | |
| G06T 3/40 | (2006.01) | |

(52) U.S. Cl.
CPC ........ *G06F 3/0488* (2013.01); *G06F 3/04845* (2013.01); *G06T 3/40* (2013.01); *G06F 2203/04806* (2013.01); *G06F 2203/04808* (2013.01); *G06T 2210/22* (2013.01)

(58) Field of Classification Search
CPC . G06F 2203/04806; G06F 2203/04808; G06F 3/04845; G06F 3/0488; G06T 2210/22; G06T 3/40
See application file for complete search history.

(56) References Cited

U.S. PATENT DOCUMENTS

| | | | |
|---|---|---|---|
| 2010/0171712 A1* | 7/2010 | Cieplinski | ........... G06F 3/04883 345/173 |
| 2011/0013049 A1* | 1/2011 | Thorn | .................. G06F 3/0488 348/240.3 |
| 2012/0098639 A1 | 4/2012 | Ijas | |
| 2014/0019917 A1* | 1/2014 | Piemonte | ................ G06F 3/017 715/848 |

FOREIGN PATENT DOCUMENTS

| | | |
|---|---|---|
| CN | 101907969 A | 12/2010 |
| CN | 102474560 A | 5/2012 |
| EP | 2696269 A1 | 2/2014 |
| WO | 2012056090 A1 | 5/2012 |

OTHER PUBLICATIONS

Corresponding extended European search report that these art references were dated Nov. 15, 2016.
Corresponding Chinese office action dated Feb. 15, 2019.

\* cited by examiner

*Primary Examiner* — Insa Sadio
(74) *Attorney, Agent, or Firm* — CKC & Partners Co., LLC (57) ABSTRACT

A crop frame adjusting method includes displaying an image; displaying a crop frame on the image; and in response to touches within a virtual frame corresponding to the crop frame are detected, resizing the crop frame according to movements of the touches, wherein the virtual frame is extended from the crop frame.

18 Claims, 5 Drawing Sheets

CROP FRAME ADJUSTING METHOD, IMAGE PROCESSING DEVICE, AND NON-TRANSITORY COMPUTER READABLE STORAGE MEDIUM

RELATED APPLICATIONS

This application claims priority to Provisional U.S. Application Ser. No. 62/183,755 filed Jun. 24, 2015, which is herein incorporated by reference.

BACKGROUND

Technical Field

The present disclosure relates to an electronic device, a method, and a non-transitory computer readable storage medium. More particularly, the present disclosure relates to an image processing device, a crop frame adjusting method, and a non-transitory computer readable storage medium.

Description of Related Art

With advances in electronic technology, image processing devices are being increasingly used.

A cropping operation is frequently used in an image processing operation to segment a certain portion of an image within a crop frame. Therefore, adjusting the crop frame in a convenient way is an important area of research in the field of image processing.

SUMMARY

One aspect of the present disclosure is related to a crop frame adjusting method. In accordance with one embodiment of the present disclosure, the method includes displaying an image; displaying a crop frame on the image; and in response to touches within a virtual frame corresponding to the crop frame are detected, resizing the crop frame according to movements of the touches, wherein the virtual frame is extended from the crop frame.

In accordance with one embodiment of the present disclosure, the operation of resizing the crop frame according to the movements of the touches includes shifting two adjacent sides of the crop frame according to a movement of a first touch of the touches, and shifting another two adjacent sides of the crop frame according to a movement of a second touch of the touches.

In accordance with one embodiment of the present disclosure, the crop frame adjusting method further includes dividing the virtual frame into four regions, in which the first touch and the second touch are located at two diagonal regions of the four regions.

In accordance with one embodiment of the present disclosure, the crop frame adjusting method further includes in response to that the touches within the virtual frame are detected, shifting the crop frame according to the movements of the touches.

In accordance with one embodiment of the present disclosure, the touches include two touches, and the operation of shifting the crop frame includes shifting the crop frame according to a displacement of a point calculated by the touches.

In accordance with one embodiment of the present disclosure, the touches include two touches, and the point is a middle point of a line segment formed by the two touches.

In accordance with one embodiment of the present disclosure, the crop frame adjusting method further includes zooming in or zooming out the image according to the movements of the touches.

In accordance with one embodiment of the present disclosure, the crap frame adjusting method further includes zooming in or zooming out the image when a moving speed of the touches is lower than a predetermined threshold.

Another aspect of the present disclosure relates to an image processing device. In accordance with one embodiment of the present disclosure, the image processing device includes a display component, a touch sensor, and a processing component. The processing component is configured for displaying, through the display component, an image; displaying, through the display component, a crop frame on the image; and resting the crop frame according to movements of the touches in response to touches within a virtual frame corresponding to the crop frame are detected by the touch sensor. The virtual frame is extended from the crop frame.

In accordance with one embodiment of the present disclosure, the processing component is further configured for shifting two adjacent sides of the crop frame according to a movement of a first touch of the touches, and shifting another two adjacent sides of the crop frame according to a movement of a second touch of the touches.

In accordance with one embodiment of the present disclosure, the virtual frame is divided into four regions, and the first touch and the second touch are located at two diagonal regions of the four regions.

In accordance with one embodiment of the present disclosure, the processing component is further configured for shifting the crop frame according to movements of the touches in response to the touches within the virtual frame are detected.

In accordance with one embodiment of the present disclosure, the touches include two touches, and the processing component is further configured for shifting the crop frame according to a displacement of a middle point of the two touches.

In accordance with one embodiment of the present disclosure, the processing component is further configured for zooming in or zooming out the image according to the movements of the touches.

Another aspect of the present disclosure is related to a non-transitory computer readable storage medium. In accordance with one embodiment of the present disclosure, the non-transitory computer readable storage medium is for storing a computer program, which, when executed, causes a processor to perform operations includes displaying an image; displaying a crop frame on the image; and in response to touches within a virtual frame corresponding to the crop frame are detected, resizing the crop frame according to movements of the touches. The virtual frame is extended from the crop frame.

In accordance with one embodiment of the present disclosure, the operation of resizing the crop frame according to movements of the touches includes shifting two adjacent sides of the crop frame according to a movement of a first touch of the touches; and shifting another two adjacent sides of the crop frame according to a movement of a second touch of the touches.

In accordance with one embodiment of the present disclosure, the operations further includes shifting the crop frame according to movements of the touches in response to the touches within the virtual frame are detected.

In accordance with one embodiment of the present disclosure, the touches comprise two touches, and the operation of shifting the crop frame includes shifting the crop frame according to a displacement of a middle point of the two touches.

In accordance with one embodiment of the present disclosure, the operations further include zooming in or zooming out the image according to the movements of the touches.

In accordance with one embodiment of the present disclosure, the operations further include zooming in or zooming out the image when a moving speed of the touches is lower than a predetermined threshold.

Through an application of one embodiment described above, the crop frame can be adjusted in a convenient way.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to an image processing device. In the paragraphs below, a smart phone or a tablet computer will be taken as an example to describe details of the image processing device. However, the present disclosure is not limited in this regard.

Figure 1:
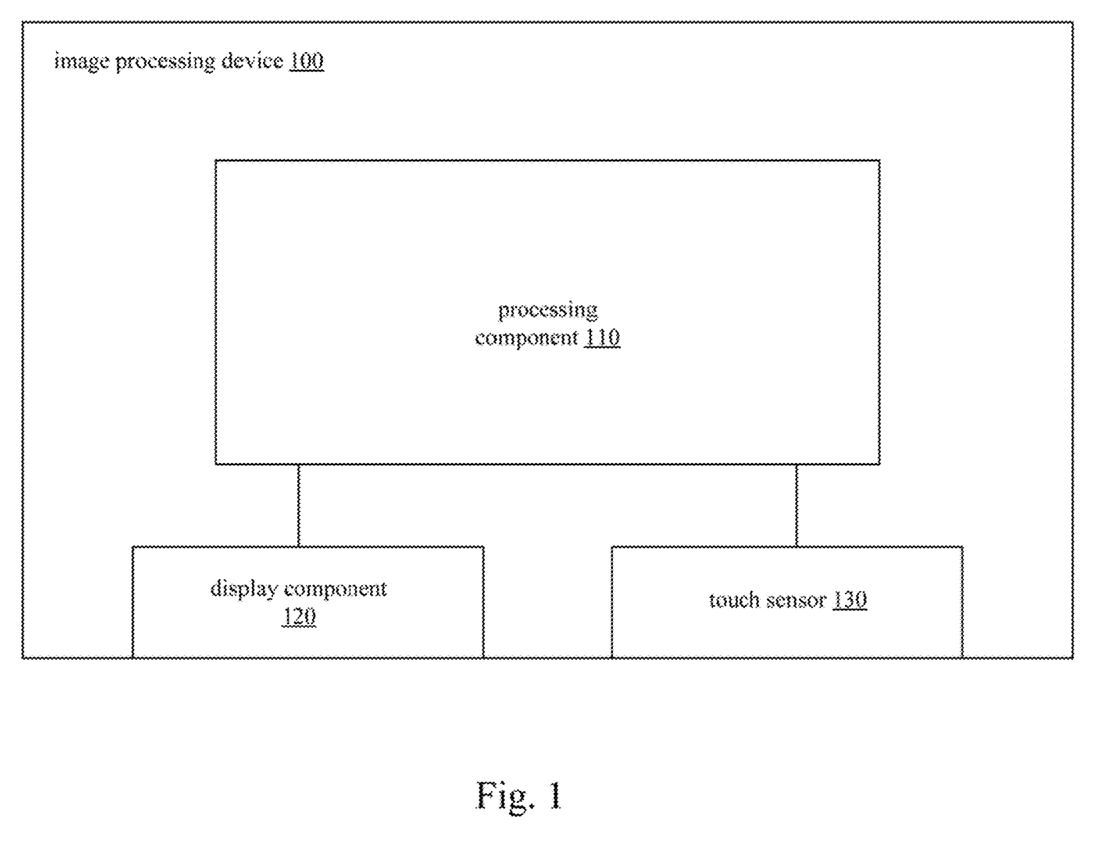
FIG. 1 is a schematic block diagram of an image processing device in accordance with one embodiment of the present disclosure.

FIG. 1 is a schematic block diagram of an image processing device 100 in accordance with one embodiment of the present disclosure. In this embodiment, the image processing device 100 includes a processing component 110, a display component 120, and a touch sensor 130. In one embodiment, the processing component 110 is electrically connected to the display component 120 and the touch sensor 130.

In one embodiment, the processing component 110 can be realized by, for example, a processor, such as a central processor, a microprocessor, or a digital signal processor (DSP), but is not limited in this regard. The display component 120 can be realized by, for example, a display, such as a liquid crystal display, an active matrix organic light emitting display (AMOLED), or an e-paper display, but is not limited in this regard. The touch sensor 130 can be realized by, for example, a touch sensing pad, but is not limited in this regard. In one embodiment, the display component 120 and the touch sensor 130 can be integrated as a touch display component, but the present disclosure is not limited to such an embodiment.

In one embodiment, the display component 120 is configured to display an image and display a crop frame on the image. The touch sensor 130 is configured to detect two touches corresponding to the crop frame. The processing component 110 is configured to adjust the crop frame according to movements of the two touches. After the crop frame is determined, the processing component 110 can segment a portion of the image within the crop frame.

Details of the present disclosure are described in the paragraphs below with reference to a crop frame adjusting method in FIG. 2. However, the present disclosure is not limited to the embodiment below.

It should be noted that the crop frame adjusting method can be applied to an image processing device having a structure that is the same as or similar to the structure of the image processing device 100 shown in FIG. 1. To simplify the description below, in the following paragraphs, the embodiment shown in FIG. 1 will be used as an example to describe the crop frame adjusting method according to an embodiment of the present disclosure. However, the present disclosure is not limited to application to the embodiment shown in FIG. 1.

It should be noted that, in some embodiments, the crop frame adjusting method may be implemented as a computer program. When the computer program is executed by a computer, an electronic device, or the image processing device 100 in FIG. 1, this executing device performs the crop frame adjusting method. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

In addition, it should be noted that in the operations of the following crop frame adjusting method, no particular sequence is required unless otherwise specified. Moreover, the following operations also may be performed simultaneously or the execution times thereof may at least partially overlap.

Furthermore, the operations of the following crop frame adjusting method may be added to, replaced, and/or eliminated as appropriate, in accordance with various embodiments of the present disclosure.

Figure 2:
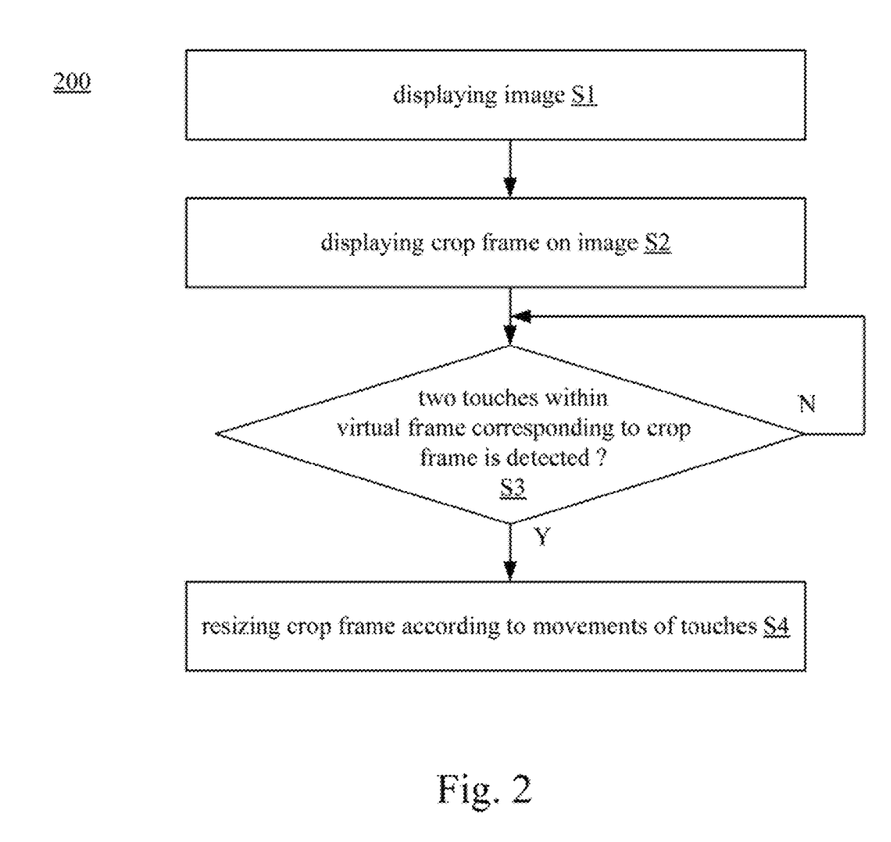
FIG. 2 is a flowchart of a crop frame adjusting method in accordance with one embodiment of the present disclosure.

Reference is made to FIGS. 1 and 2. The crop frame adjusting method 200 includes the operations below.

In operation S1, the processing component 110 utilizes the display component 120 to display an image.

In operation S2, the processing component 110 utilizes the display component 120 to display a crop frame on the image. In one embodiment, the crop frame is a rectangular frame, but is not limited in this regard. Another shape, such as a triangle or a circle, is within the contemplated scope of the present disclosure.

In operation S3, the processing component 110 determines whether two touches within a virtual frame corresponding to the crop frame are detected by the touch sensor 130. If so, operation S4 is performed. If not, the processing component 110 continuously determines whether two touches within the virtual frame corresponding to the crop frame are detected by the touch sensor 130.

In one embodiment, the virtual frame is larger than the crop frame. In one embodiment, the virtual frame is extended from the crop frame. In one embodiment, the edge of the virtual frame is extended from the edge of the crop frame for a predetermined length. In one embodiment, the virtual frame is a rectangular frame, but is not limited in this regard.

In operation S4, in response to two touches within the virtual frame are detected, the processing component 110 resizes the crop frame according to movements of the two touches. In one embodiment, the size of the resized crop frame corresponds to the movements of the two touches and an original size of the crop frame before resizing.

In one embodiment, the processing component 110 may shift two adjacent sides of the crop frame according to a movement of one of the two touches. In one embodiment, the two adjacent sides of the crop frame may be shifted according to a displacement of one of the two touches.

In one embodiment, the processing component 110 may equally divide the crop frame into four regions (e.g., four quadrants). Each of the regions corresponds to two adjacent sides of the crop frame. Under a condition that a first touch of the two touches is located at a first region and a second touch of the two touches is located at a second region diagonally opposite to the first region, the processing component 110 shifts two adjacent sides of the crop frame corresponding to the first region according to a movement of the first touch, and shifts another two adjacent sides of the crop frame corresponding to the second region according to a movement of the second touch.

In another embodiment, under a condition that a first touch is located at a first region and a second touch is located at a second region adjacent to the first region, the processing component 110 shifts two adjacent sides of the crop frame corresponding to the first region according to a movement of the first touch, and shifts two adjacent sides of the crop frame corresponding to the second region according to a movement of the second touch, in which one of the two adjacent sides corresponding to the first region and one of the two adjacent sides corresponding to the second region are identical. That is, the processing component 110 shifts three adjacent sides of the crop frame corresponding to movements of two touches. In some embodiments, the other one side of the crop frame, which does not correspond to the first region and the second region, is maintained at the same place.

It should be noted that, in some embodiment, the processing component 110 may unequally divide the crop frame into four regions based on actual requirements. Thus, various ways of dividing the crop frame are within the contemplated scope of the present disclosure.

In one embodiment, the processing component 110 may zoom in or zoom out the image through the display component 120 during resizing the crop frame. In one embodiment, the processing component 110 may zoom in or zoom out the image according to the movements of the two touches.

In one embodiment, the processing component 110 may zoom in or zoom out the image when a moving speed of the two touches is lower than a predetermined threshold. In one embodiment, when a shifting speed of one of the two touches is lower than a predetermined threshold, the processing component 110 zooms in or zooms out the image. In another embodiment, when an average of shifting speeds of the two touches is lower than a predetermined threshold, the processing component 110 zooms in or zooms out the image. In another embodiment, when an increasing rate or a decreasing rate of the distance between the two touches is lower than a predetermined threshold, the processing component 110 zooms in or zooms out the image. It should be noted that the aspects of the "moving speed of the two touches" described above are for illustration purposes, and other aspects are within the contemplated scope of the present disclosure.

In one embodiment, the processing component 110 zooms in or zooms out the image according to the movements of the two touches. When the distance between touches is increased, the processing component 110 may zoom out the image. On the other hand, when the distance between touches is decreased, the processing component 110 may zoom in the image.

With the operations in one embodiment of the present disclosure described above, the crop frame can be adjusted in a convenient way. In addition, since the crop frame is adjusted according to movements of two touches, the crop frame can be resized non-proportionally.

Moreover, with zooming in and zooming out operations during resizing the crop frame, the size and the location of the crop frame can be adjusted more conveniently.

To allow the disclosure to be more fully understood, an operative example is described in the paragraphs below, but the present disclosure is not limited to the example below.

Figure 3A:
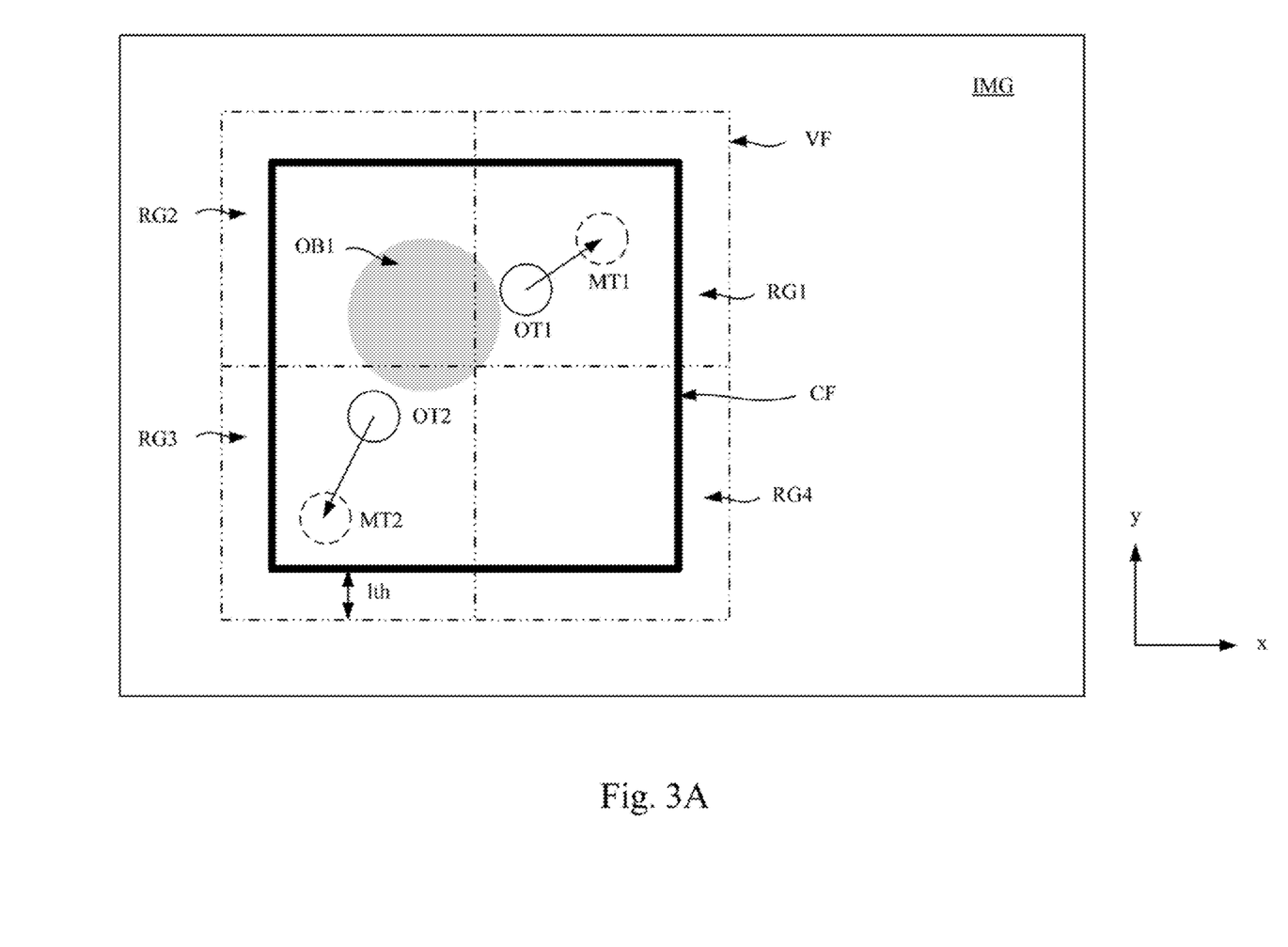
FIGS. 3A and 3B illustrate an operative example of a crop frame adjusting method in accordance with one embodiment of the present disclosure.
Figure 3B:
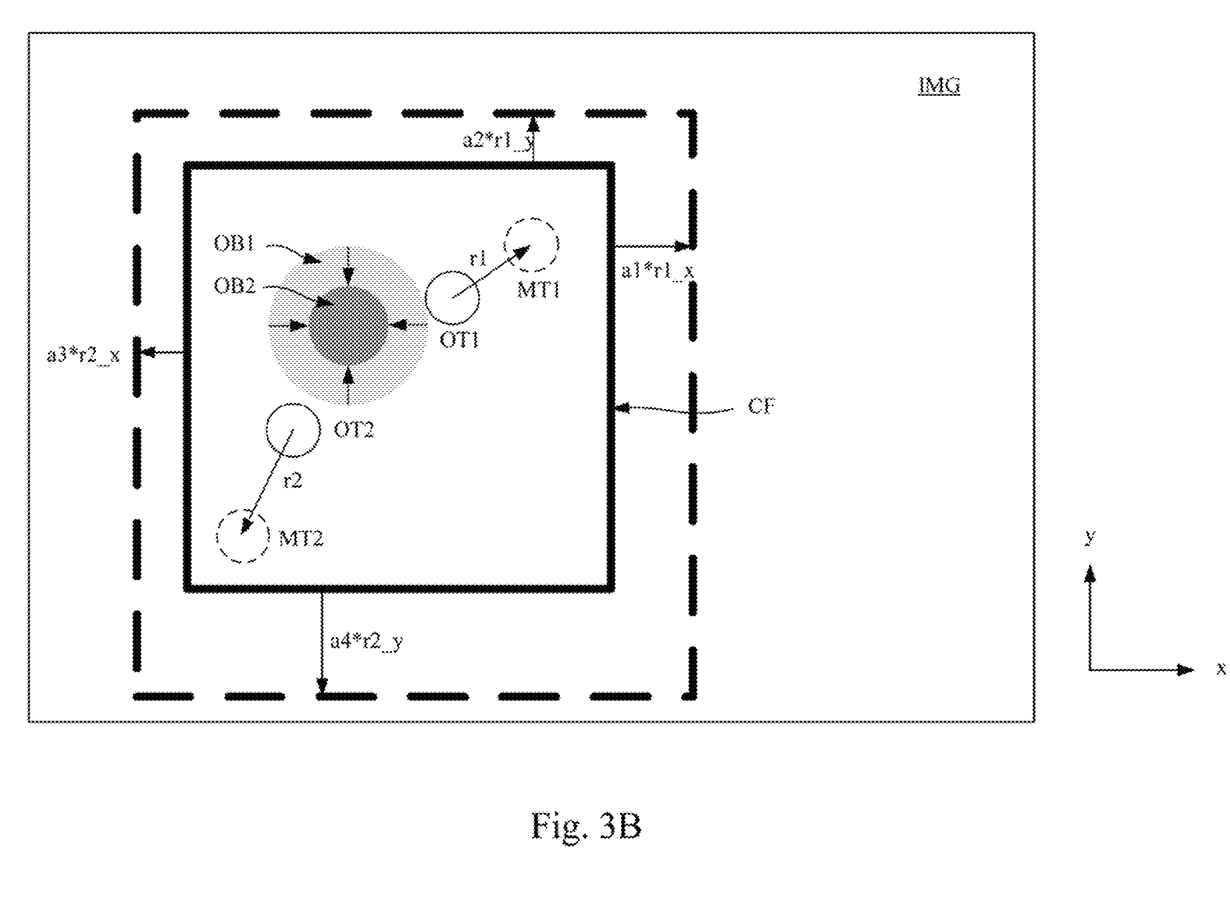

Reference is made to FIGS. 3A and 3B. In this embodiment, an image IMG with a pattern OB1 may be presented on the display component 120. The display component 120 displays a crop frame CF on a certain portion of the image IMG. The processing component 110 determines a virtual frame VF by extending the crop frame CF with an extended length lth. The processing component 110 equally divides the virtual frame VF into four regions RG1-RG4. The region RG1 located at the top-right corner of the virtual frame VF corresponds to an upper side and a right side of the crop frame CF. The region RG2 located at the top-left corner of the virtual frame VF corresponds to the upper side and a left side of the crop frame CF. The region RG3 located at the bottom-left corner of the virtual frame VF corresponds to a bottom side and the left side of the crop frame CF. The region RG4 located at the bottom-right corner of the virtual frame VF corresponds to the bottom side and the right side of the crop frame CF.

When a user touches the display component 120 of the image processing device 100 with his/her two fingers at the regions RG1, RG3, the touch sensor 130 detects two touches respectively within the regions RG1, RG3 of the virtual frame VF, and the processing component 110 starts to perform an adjustment of the crop frame CF according to the movements of the two touches.

Particular reference is made to FIG. 3B. When the user drags his/her first finger from the location OT1 to a location MT1 and drags his/her second finger from the location OT2 to a location MT2, the processing component 110 shifts the upper side and the right side of the crop frame CF according to the displacement r1 of the first touch and shifts the bottom side and the left side of the crop frame CF according to the displacement r2 of the second touch.

For example, in this case, the first touch is shifted in the +x direction by a length $r1\_x$, and shifted in the +y direction by a length $r1\_y$. The second touch is shifted in the −x direction by a length $r2\_x$, and shifted in the −y direction by a length $r2\_y$. The processing component 110 may shift the right side of the crop frame CF in the +x direction by a length equal to $a1*r1\_x$, shift the upper side of the crop frame CF in the +y direction by a length equal to $a2*r1\_y$, shift the left side of the crop frame CF in the −x direction by a length equal to $a3*r2\_x$, and shift the bottom side of the crop frame CF in the −y direction by a length equal to $a4*r2\_y$. The values a1-a4 may be predetermined constants. The values may be identical, partially identical, or different from each other.

In addition, when the moving speed of the fingers (i.e., the two touches) is lower than a predetermined threshold, the processing component 110 zooms out the image IMG, so that the pattern OB1 displayed on the display component 120 is shrunk to the pattern OB2.

Through such operations, the crop frame CF can be resized conveniently. In addition, the user can easily crop a larger portion of the image IMG by the magnified crop frame CF and the zoomed out image IMG.

In one embodiment of the present disclosure, the crop frame adjusting method 200 may further include a shifting operation. In this operation, under a condition that the two touches within the virtual frame are detected by the touch sensor, the processing component 110 shifts the crop frame according to movements of the two touches. In one embodiment, the crop frame may be shifted according to a displacement of a virtual point calculated by the two touches. In one embodiment, the virtual point is a middle point of a line segment formed by the two touches. That is, the crop frame may be shifted according to a displacement of a middle point of the two touches. In one embodiment, the processing component 110 may shift and resize the crop frame simultaneously. It should be noted that, the virtual point may be any suitable point calculated by the two touches based on actual requirements, and the present disclosure is not limited to the embodiment described herein.

In one embodiment, the processing component 110 may determine whether the virtual point calculated by the two touches is located within a shifting frame corresponding to the crop frame. Under a condition that the virtual point calculated by the two touches is located within the shifting frame, the processing component 110 shifts the crop frame according to a displacement of a virtual point calculated by the two touches.

In one embodiment, the shifting frame is smaller than the crop frame. In one embodiment, the shifting frame may be shrunk from the crop frame. In one embodiment, the edge of the shifting frame is shrunk from the crop frame by a predetermined length. In one embodiment, the shifting frame is a rectangular frame, but the present disclosure is not limited in this regard.

To allow the disclosure to be more fully understood, an operative example is described in the paragraphs below, but the present disclosure is not limited to the example below.

Figure 4:
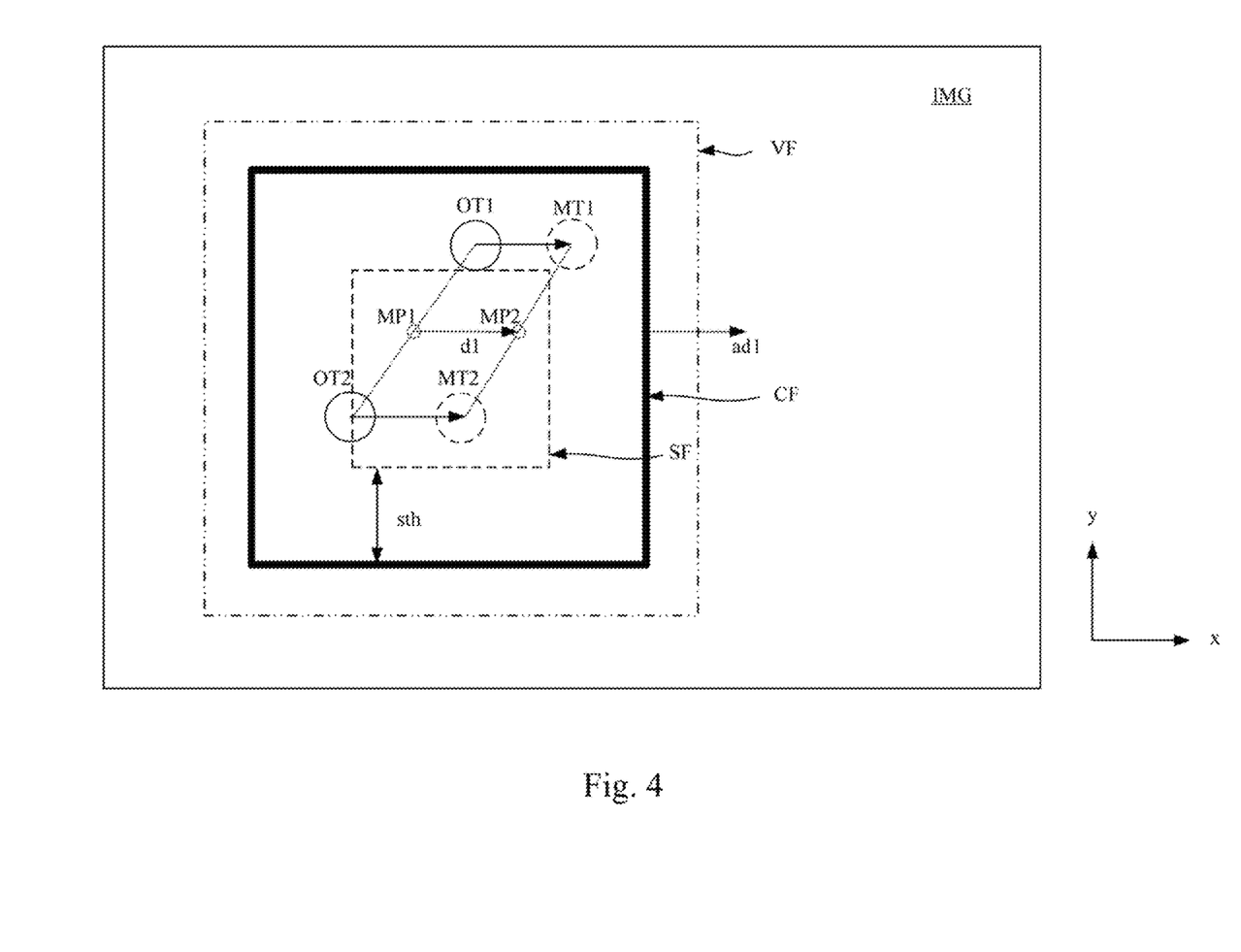
FIG. 4 illustrates an operative example of a crop frame adjusting method in accordance with one embodiment of the present disclosure.

Reference is made to FIG. 4. In this embodiment, an image IMG may be presented on the display component 120. The display component 120 displays a crop frame CF on a certain portion of the image IMG. The processing component 110 determines a virtual frame VF by extending the crop frame CF. The processing component 110 determines a shifting frame SF by shrinking the crop frame CF with a shrinking length sth.

When a user touches the image processing device 100 with his/her two fingers at locations OT1, OT2, the touch sensor 130 detects two touches within the virtual frame VF. The processing component 110 determines the location MP1 of the virtual point calculated by the two touches (e.g., a middle point of the two touches) is within the shifting frame SF, and starts to perform a shifting operation of the crop frame CF according to the movement of the virtual point calculated by the two touches.

When the user drags his/her first fingers from locations OT1, OT2 to locations MT1, MT2, the virtual point calculated by the two touches is shifted from the location MP1 to the location MP2 with a displacement d1 in the +x direction. At this time, the processing component 110 shifts the crop frame CF by a length $a5*d1$, in which the value a5 may be a predetermined constant.

Through such operations, the crop frame CF can be adjusted in a convenient way.

Although the present invention has been described in considerable detail with reference to certain embodiments thereof, other embodiments are possible. Therefore, the scope of the appended claims should not be limited to the description of the embodiments contained herein.

What is claimed is:

1. A crop frame adjusting method comprising:
    displaying an image;

displaying a crop frame on the image;
in response to touches within a virtual frame corresponding to the crop frame are detected, resizing the crop frame according to movements of the touches, wherein the virtual frame is extended from the crop frame;
determining, based on a moving speed of the touches, whether or not to zoom in or zoom out the image according to movements of the touches; and
zooming in or zooming out the image according to movements of the touches when the moving speed of the touches is lower than a predetermined threshold.

2. The crop frame adjusting method as claimed in claim 1, wherein the operation of resizing the crop frame according to the movements of the touches comprises:
shifting two adjacent sides of the crop frame according to a movement of a first touch of the touches; and
shifting another two adjacent sides of the crop frame according to a movement of a second touch of the touches.

3. The crop frame adjusting method as claimed in claim 2 further comprising:
dividing the virtual frame into four regions, wherein the first touch and the second touch are located at two diagonal regions of the four regions.

4. The crop frame adjusting method as claimed in claim 1 further comprising:
in response to that the touches within the virtual frame are detected, shifting the crop frame according to the movements of the touches.

5. The crop frame adjusting method as claimed in claim 4, wherein the operation of shifting the crop frame comprises:
shifting the crop frame according to a displacement of a point calculated by the touches.

6. The crop frame adjusting method as claimed in claim 5, wherein the touches comprise two touches, the point is a middle point of a line segment formed by the touches.

7. The crop frame adjusting method as claimed in claim 1 further comprising:
zooming in or zooming out the image according to the movements of the touches.

8. An image processing device comprising:
a display component;
a touch sensor; and
a processing component configured for:
displaying, through the display component, an image;
displaying, through the display component, a crop frame on the image;
in response to touches within a virtual frame corresponding to the crop frame are detected by the touch sensor, resizing the crop frame according to movements of the touches;
wherein the virtual frame is extended from the crop frame;
determining, based on a moving speed of the touches, whether or not to zoom in or zoom out the image according to movements of the touches; and
zooming in or zooming out the image according to movements of the touches when the moving speed of the touches is lower than a predetermined threshold.

9. The image processing device as claimed in claim 8, wherein the processing component is further configured for:
shifting two adjacent sides of the crop frame according to a movement of a first touch of the touches; and
shifting another two adjacent sides of the crop frame according to a movement of a second touch of the touches.

10. The image processing device as claimed in claim 9, wherein the virtual frame is divided into four regions, and the first touch and the second touch are located at two diagonal regions of the four regions.

11. The image processing device as claimed in claim 8, wherein the processing component is further configured for:
in response to the touches within the virtual frame are detected, shifting the crop frame according to movements of the touches.

12. The image processing device as claimed in claim 11, wherein the touches comprise two touches, and the processing component is further configured for:
shifting the crop frame according to a displacement of a middle point of the two touches.

13. The image processing device as claimed in claim 8, wherein the processing component is further configured for:
zooming in or zooming out the image according to the movements of the touches.

14. A non-transitory computer readable storage medium for storing a computer program, which, when executed, causes a processor to perform operations comprising:
displaying an image;
displaying a crop frame on the image;
in response to touches within a virtual frame corresponding to the crop frame are detected, resizing the crop frame according to movements of the touches;
wherein the virtual frame is extended from the crop frame;
determining, based on a moving speed of the touches, whether or not to zoom in or zoom out the image according to movements of the touches; and
zooming in or zooming out the image according to movements of the touches when the moving speed of the touches is lower than a predetermined threshold.

15. The non-transitory computer readable storage medium as claimed in claim 14, wherein the operation of resizing the crop frame according to movements of the touches comprises:
shifting two adjacent sides of the crop frame according to a movement of a first touch of the touches; and
shifting another two adjacent sides of the crop frame according to a movement of a second touch of the touches.

16. The non-transitory computer readable storage medium as claimed in claim 14, wherein the operations further comprise:
in response to the touches within the virtual frame are detected, shifting the crop frame according to the movements of the touches.

17. The non-transitory computer readable storage medium as claimed in claim 16, wherein the touches comprise two touches, and the operation of shifting the crop frame comprises:
shifting the crop frame according to a displacement of a middle point of the two touches.

18. The non-transitory computer readable storage medium as claimed in claim 14, wherein the operations further comprise:
zooming in or zooming out the image according to the movements of the touches.

* * * * *